May 16, 1961  G. H. BUSHWAY  2,984,169
CORN POPPING MACHINE
Filed Jan. 27, 1960  3 Sheets-Sheet 1

Inventor:
George H. Bushway,
by  KENWAY, JENNEY, WITTER & HILDRETH
Attorneys

May 16, 1961  G. H. BUSHWAY  2,984,169
CORN POPPING MACHINE
Filed Jan. 27, 1960  3 Sheets-Sheet 2
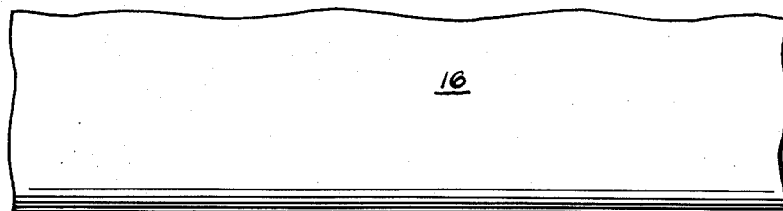
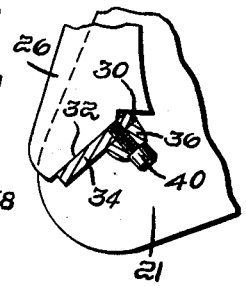
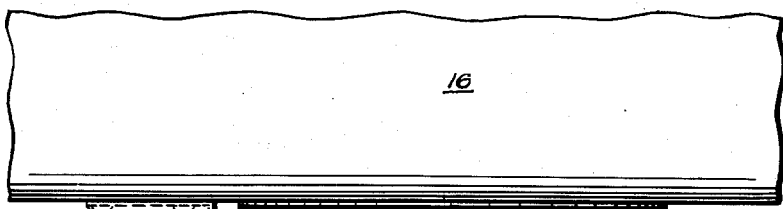
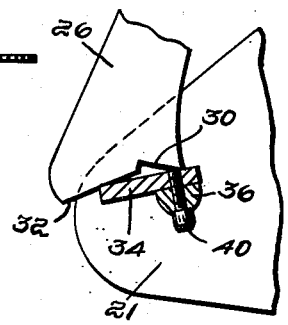
Inventor:
George H. Bushway,
by KENWAY, JENNEY, WITTER & HILDRETH
Attorneys May 16, 1961  G. H. BUSHWAY  2,984,169
CORN POPPING MACHINE
Filed Jan. 27, 1960  3 Sheets-Sheet 3

Inventor:
George H. Bushway,
by KENWAY, JENNEY, WITTER & HILDRETH
Attorneys

United States Patent Office 2,984,169
Patented May 16, 1961

2,984,169

CORN POPPING MACHINE

George H. Bushway, Lamie's Bldg., Lafayette Road, Hampton, N.H.

Filed Jan. 27, 1960, Ser. No. 5,065

9 Claims. (Cl. 99—238.5)

In my Patent 2,907,264 is disclosed a fully automatic machine adapted to pop and discharge successive batches of corn without requiring any manual operation or control. My present invention relates to a similar but relatively simpler and inexpensive corn popping machine constructed to be manually operated. The machine is embodied in a fully operative unit adapted to be mounted in the glass enclosed top chamber portion of a pop corn dispensing cabinet. The unit embodies a pan hung from the top wall of the cabinet, a pivotally mounted popping kettle therebeneath and a corn feeding tube from the pan to the kettle. Corn to be popped together with cooking oil are manually fed through the corn feeding tube in measured batches from the pan to the kettle and the popped corn is dumped by pivoting the kettle downwardly from horizontal corn popping position.

While the machine is constructed for manual operation various novel features comprising the invention herein are provided for facilitating these operations. These features include: a cover resting on and enclosing the kettle but disposed to be lifted by popped corn as the latter expands to kettle overflowing capacity, the cover being disposed to ride upwardly on the corn feeding tube; a novel corn agitating mechanism disposed centrally within the kettle and corn feeding tube; and latch mechanism for holding the kettle in horizontal corn popping position and including means for automatically releasing the latch when the kettle is manually pivoted to the corn dumping position. The production of an improved corn popping machine embodying these and other novel features hereinafter more specifically described comprises the primary object of the invention.

Figure 1:
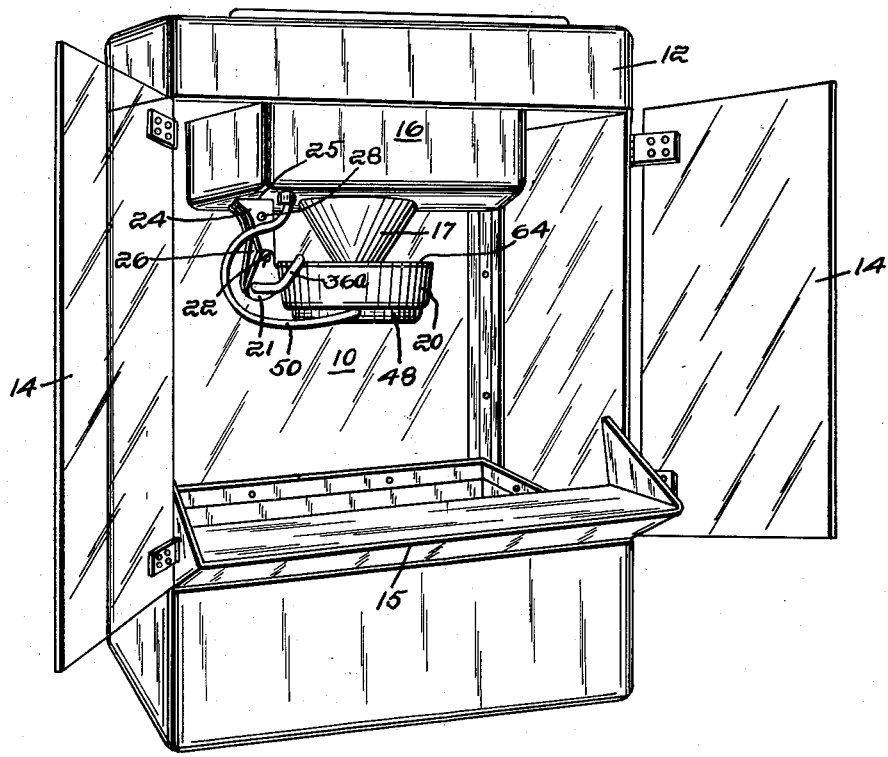
Figure 8:
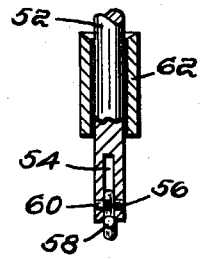
Figure 4:
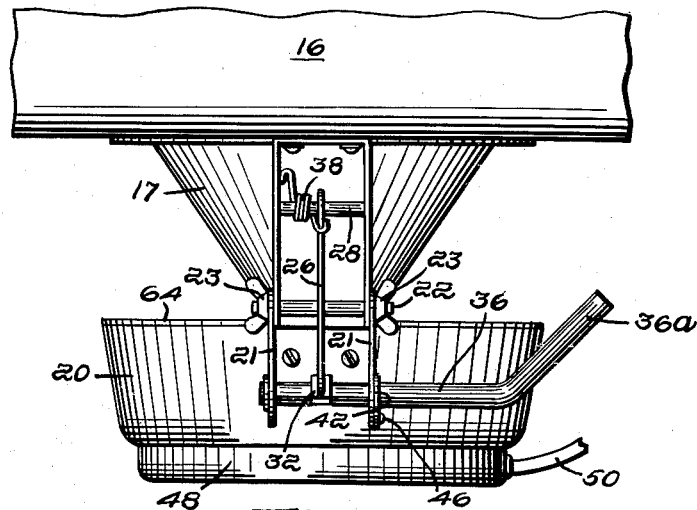
Figure 5:
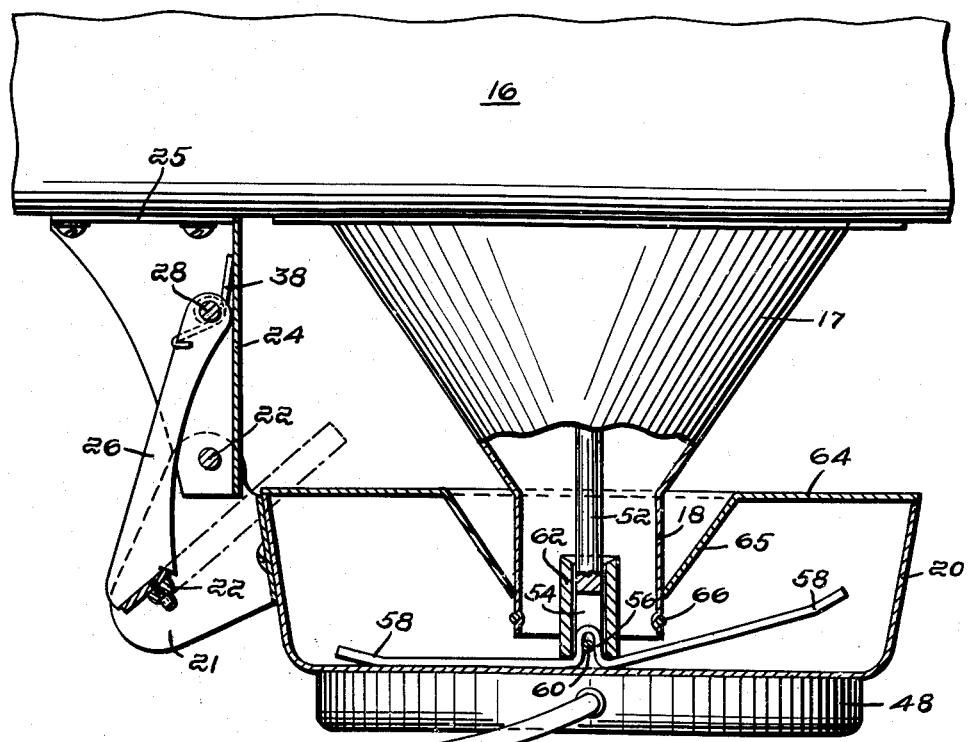

These and other features of the invention will be best understood and appreciated from the following description of a preferred embodiment thereof selected for purposes of illustration and shown in the accompanying drawings in which:

Fig. 1 is a front perspective view of a corn popping and dispensing cabinet embodying the invention, Fig. 2 is an enlarged front elevation of the popping unit in corn popping position, Fig. 3 is a like view showing the popping kettle in corn dumping position, Fig. 4 is a side elevation of Fig. 2, Fig. 5 is an enlarged fragmentary view of Fig. 2, partially in section, Fig. 6 is a fragmentary view of the kettle latching mechanism in latched position, Fig. 7 is a like view showing the latch in released position, and Fig. 8 is a fragmentary sectional view of a detail shown right-angular to that illustrated in Fig. 5.

In Fig. 1 of the drawings I have illustrated the corn popping machine as housed within the upper chamber 10 of a corn dispensing cabinet 12. The chamber 10 also serves as a storage bin for the popped corn, the chamber walls, including two pivoted doors 14 at the front of the chamber, being transparent to expose both the machine and popped corn to full view. A pivoted shelf is provided at 15 to facilitate the corn dispensing operation.

The corn popping mechanism is embodied in a unit including a pan 16 hung on the cabinet ceiling wall within the chamber 10. Supported on and depending downwardly from the pan is a corn feeding tubular member having a funnel-like upper portion 17 and a lower cylindrical portion 18. A circular popping kettle 20 is provided with a bracket 21 pivoted at 22 to a U-shaped bracket 24 secured to the pan at 25, the kettle being pivotally movable to and from a horizontal popping position (Fig. 2) and a corn dumping position (Fig. 3). The pivotal connection at 22 includes one or more wing nuts 23 whereby the pivot bolt 22 can be removed, thereby freeing the kettle for cleaning and servicing purposes.

A latch arm 26 pivoted to the bracket 24 at 28 has at its free end a latch shoulder 30 and an abutment surface 32 adapted to engage a shoe 34 carried on a shaft 36 rotatably mounted in the lower end of the bracket arms 21, the free end 36ᵃ of the shaft providing a handle for pivoting the kettle. A spring 38 on the pivot rod 28 normally rotates the latch arm anti-clockwise to its latched position. The shoe 34 is secured to the shaft 36 by a set screw 40. An arm 42 fixed to the shaft is slotted at 44 to receive a pin 46 seated in the adjacent bracket arm 21. This slot and pin provide a lost motion connection between the shaft and kettle for automatically releasing the latch when pivoting the kettle from horizontal popping position to corn dumping position, as hereinafter described.

An electric heating unit 48 carrying a flexible cable 50 and fixed to the bottom of the kettle provides the popping heat. A shaft 52 driven by an electric motor in the pan 16 extends downwardly through the center of the feeding tube 18. The bottom end of the shaft is slotted at 54 to receive the U-loop 56 of a corn agitator having fingers 58 radiating outwardly from the loop. A pin 60 seated in bores at its ends in the shaft extends transversely across the slot adjacent to the end of the shaft and limits downward movement of the agitator (Fig. 3). A sleeve 62 slidable on the shaft is adapted in its lowermost position (Fig. 5) to retain the pin 60 and loop 56 within the shaft. The agitator can be removed by raising the sleeve above the slot and sliding the agitator laterally therethrough, or the pin 60 can be removed if desired. An important feature of the invention resides in a cover 64 normally resting on and covering the kettle (Fig. 5) and having an inner conical portion 65 extending downwardly and inwardly into sliding contact with the cylindrical tube 18. A retaining ring 66 on the tube prevents disengagement of the cover from the tube when the kettle is in corn dumping position (Fig. 3). The free sliding engagement of the cover on the tube 18 maintains the cover centered on the kettle and permits lifting of the cover by the popping corn as the latter expands to kettle overflowing capacity.

The pan 16 provides a housing for an electric motor connected to the shaft 52. Also mounted in the pan is a hopper for holding a supply of unpopped corn and a reservoir for containing a supply of cooking oil, together with known mechanism for conveniently dispensing measured batch quantities of corn and cooking oil into the feeding tube 17—18. The parts are shown in the corn popping position in Figs. 1, 2, 4 and 5 wherein the kettle is in position to receive the batch load of corn and oil. In this position (Figs. 5 and 6) the latch shoulder 30 abuts against the shoe 34, thus positively holding the kettle in popping position.

The heater unit 48 includes a thermostat which automatically predetermines the popping heat applied to the kettle and the corn and oil are deposited into the kettle only after it has been heated to this temperature. Thereafter the kettle automatically remains at this temperature while the machine is in use. The shaft 52 is continuously rotated during the popping operation whereby to keep the corn agitated in the hot oil. As the popping proceeds the cover 64 houses the corn within the kettle and as the mass of corn expands to kettle overflowing capacity it lifts the cover and spills outwardly into the chamber 10. When the popping is completed the operator moves the shaft and handle 36 and 36ª clockwise whereupon the lost motion connection at 44—46 permits free rotation of the shaft to the position of Fig. 7, thus removing the shoe 34 from its positive engagement with the latch surface 30. Continued movement of the handle pivots the kettle to the corn dumping position of Fig. 3 and simultaneously therewith the shoe 34 rides on the latch surface 32 and pivots the latch outwardly. During this operation the retaining ring 66 and the pin 60 serve to limit downward movement of the cover 64 and the agitator 56—58. When the handle is rotated anticlockwise the kettle is returned to its horizontal popping position and the lost motion connection at 44—46 brings the parts to the kettle laching position shown in Fig. 6. The sleeve 62 is normally in its downmost position wherein it holds the pin 60 and agitator 56 within the slot 54 of the shaft 52 and from which they can be removed by raising the sleeve to the position shown in Fig. 8.

Having thus disclosed my invention what I claim as new and desire to secure by Letters Patent is:

1. A popcorn machine comprising in combination a kettle having bottom and deep side walls adapted to contain popped corn, a pan disposed in spaced relation above the kettle, a tubular corn feeding member on and depending downwardly from the pan and into the kettle, a cover resting loosely on the kettle about and having annular engagement with the tubular member, a rotary shaft extending downwardly through the tubular member into the kettle, a corn agitator connected to the bottom end of the shaft and radiating outwardly in the kettle, and means mounting the kettle on and beneath the pan for pivotal movement to and from horizontal corn popping position and inclined corn dumping position.

2. The machine defined in claim 1 in which the kettle is of circular shape and disposed coaxial of the tubular member.

3. The machine defined in claim 2 in which the tubular member within the kettle is of cylindrical shape and the cover comprises an inner conical portion extending downwardly and inwardly into contact with the tubular member and an outer horizontal portion extending outwardly to the side wall of the kettle.

4. The machine defined in claim 3 plus a retaining ring on the bottom end of the tubular member for preventing disengaging of the cover therefrom when the kettle is pivoted to the corn dumping position.

5. The machine defined in claim 1 in which the bottom end of the shaft is slotted diametrically therethrough and said agitator extends into the slot, and means for maintaining the agitator in the slot.

6. The machine defined in claim 5 in which the last named means includes a pin supported in the bottom end of the shaft and extending across the slot and a sleeve slidable on and along the shaft.

7. The machine defined in claim 1 in which said means includes a bracket on and extending downwardly from the pan and a pivotal connection between the bracket and kettle, a releasable latch for holding the kettle in said horizontal position, and a handle for pivotally moving the kettle.

8. The machine defined in claim 7 plus means normally moving the latch to said pan holding position, and means for automatically releasing the latch when the handle is moved to pivot the pan from horizontal position to corn dumping position.

9. The machine defined in claim 1 in which said means includes a bracket on and extending downwardly from the pan, a bracket carried by the kettle and means pivotally connecting the brackets, a releasable latch pivoted to the first bracket and having a free end portion disposed to engage the second bracket and hold the kettle in said horizontal position, a spring normally pivoting the latch into said engagement with the second bracket, a handle carried by the second bracket for pivotally moving the kettle, and means including a lost motion connection between the handle and second bracket for automatically releasing the latch when the handle is moved to pivot the pan from horizontal position to corn dumping position.

References Cited in the file of this patent
UNITED STATES PATENTS

| | | |
|---|---|---|
| 1,658,486 | Howe | Feb. 7, 1928 |
| 2,549,449 | Gibson | Apr. 17, 1951 |